(12) United States Patent
Ermanoski et al.

(10) Patent No.: US 12,122,671 B2
(45) Date of Patent: Oct. 22, 2024

(54) TWO-STEP THERMOCHEMICAL LABYRINTH REACTOR AND METHODS

(71) Applicants: Ivan Ermanoski, Tempe, AZ (US); Ryan Milcarek, Gilbert, AZ (US); Roy Hogan, Jr., Albuquerque, NM (US); James Miller, Albuquerque, NM (US)

(72) Inventors: Ivan Ermanoski, Tempe, AZ (US); Ryan Milcarek, Gilbert, AZ (US); Roy Hogan, Jr., Albuquerque, NM (US); James Miller, Albuquerque, NM (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 519 days.

(21) Appl. No.: 17/544,422

(22) Filed: Dec. 7, 2021

(65) Prior Publication Data
US 2022/0177305 A1    Jun. 9, 2022

Related U.S. Application Data

(60) Provisional application No. 63/123,244, filed on Dec. 9, 2020.

(51) Int. Cl.
*C01B 3/06*        (2006.01)
*B01J 19/00*       (2006.01)
*B01J 19/24*       (2006.01)

(52) U.S. Cl.
CPC .......... *C01B 3/063* (2013.01); *B01J 19/0013* (2013.01); *B01J 19/249* (2013.01);
(Continued)

(58) Field of Classification Search
CPC ...... B01J 2208/00309; B01J 2219/2462; B01J 2219/2466; B01J 19/0013; C01B 3/063
See application file for complete search history.

(56) References Cited

U.S. PATENT DOCUMENTS 8,420,032 B1 *  4/2013  Ermanoski ............. F24S 20/20
                                             422/631
9,815,042 B1   11/2017  Ermanoski
(Continued)

FOREIGN PATENT DOCUMENTS

CA           2608085 A1 * 10/2006  ............ B01J 19/127

OTHER PUBLICATIONS

Babiniec, Sean M. et al., I"nvestigation of LaxSr1-xCoyM1-yO3-δ (M=Mn, Fe) perovskite materials as thermochemical energy storage media", Sol Energy 2015, 118 :451-459 (2015).
(Continued)

*Primary Examiner* — Matthew J Merkling
(74) *Attorney, Agent, or Firm* — BOOTH UDALL FULLER, PLC

(57) ABSTRACT

A thermochemical labyrinth reactor is disclosed. The reactor has a reoxidation zone and a reduction zone with electric heaters. A recuperation zone connects the reduction and reoxidation zones with first and second channels, the first channel adjoining the second channel, being separated by windows allowing an exchange of thermal radiation between channels while preventing gas exchange. The reactor also includes reactor plates composed of a reactive material, and a transit system running through the three zones, with the transit system configured to shuttle the plates between the reduction zone and the reoxidation zone, moving the plates along a circuit. The reactor also has a feedstock gas emitter to introduce a feedstock gas flowing opposite the movement of the plates. A gas extractor is configured to extract a product gas resulting from the feedstock gas being split by the oxidizing reactive material. All three zones are surrounded by an insulating housing.

20 Claims, 7 Drawing Sheets

(52) U.S. Cl.
CPC ............... *B01J 2208/00309* (2013.01); *B01J 2219/2462* (2013.01); *B01J 2219/2466* (2013.01)

(56) References Cited

U.S. PATENT DOCUMENTS

| | | | |
|---|---|---|---|
| 2003/0029088 A1* | 2/2003 | Lyon | C10J 3/463 423/437.1 |
| 2004/0152790 A1* | 8/2004 | Cornaro | B01J 23/83 518/719 |
| 2006/0188433 A1* | 8/2006 | Weimer | B01J 19/127 423/605 |
| 2009/0000194 A1* | 1/2009 | Fan | C01B 3/16 48/199 R |
| 2012/0171588 A1* | 7/2012 | Fan | C01B 3/34 429/417 |

OTHER PUBLICATIONS

Babiniec, Sean M. et al., "Doped calcium manganites for advanced high-temperature thermochemical energy storage", International Journal of Energy Research, 40:280-294 (2016).

Ermanoski, Ivan et al., "A New Reactor Concept for Efficient Solar-Thermochemical Fuel Production", Journal of Solar Engineering, 135, pp. 1-10 (Aug. 2013).

Ermanoski, Ivan, "Cascading pressure thermal reduction for efficient solar fuel production", International Journal of Hydrogen Energy, 39:13114-13117 (2014).

Ermanoski, Ivan et al., "Thermally-driven adsorption/desorption cycle for oxygen pumping in thermochemical fuel production", Solar Energy, 198:578-585 (2020).

Motto, Alexis L., "On the Exact Solution of a Class of Stackelberg Games", Proc. Am. Control Conf, Portland, OR,, pp. 249-250 (Jun. 2005).

Paul, Brian et al., "Conceptual Design of a Manufacturing Process for an Automotive Microchannel Heat Exchanger", 17th International Refrigeration and Air Conditioning Conference, West Lafayette, IN, https://docs.lib.purdue.edu/iracc/2052/. (Jul. 9-12).

Wang, Yi et al., "Mixed-integer linear programming-based optimal configuration planning for energy hub: Starting from scratch", Applied Energy, 210:1141-1150 (2018).

\* cited by examiner

TWO-STEP THERMOCHEMICAL LABYRINTH REACTOR AND METHODS

RELATED APPLICATIONS

This application claims the benefit of U.S. provisional patent application 63/123,244, filed Dec. 9, 2020 titled "Two-Step Thermochemical Labyrinth Reactor," the entirety of the disclosure of which is hereby incorporated by this reference.

TECHNICAL FIELD

Aspects of this document relate generally to thermochemical reactors.

BACKGROUND

Thermochemical reactors can provide an effective means for water splitting and carbon dioxide splitting. These reactors are able to produce energized chemicals (e.g., hydrogen and carbon monoxide), which can subsequently be used in other chemical reactions (e.g., to reduce, add functionality, hydroprocess, etc.) or from which other chemicals can be made (e.g., hydrocarbon fuels, ammonia, etc.). These reactors employ thermochemical cycles, which combine heat sources with chemical reactions to split bonds and generate a desired product stream.

In order for thermochemical reactors to be economically competitive with other competing technologies, they must be efficient while remaining sufficiently inexpensive to manufacture and operate. In water splitting, the main competing technologies are steam-methane reforming (which is not renewable) and electrolysis. The advantages thermochemical reactors may provide over electrolysis include a potentially much lower capital cost and improved robustness to impurities in the feedstock water. In carbon dioxide splitting, thermochemical reactors are the most advanced technology.

One of the ways that the operating expense and carbon footprint of thermochemical reactors is kept down is through the use of renewable energy to provide the necessary heat. In some cases, conventional thermochemical reactors have harnessed direct, concentrated solar flux to provide the needed heat for splitting. However, such implementations are accompanied by a number of difficulties. Like other solar technologies, the use of concentrated solar flux is subject to the availability of direct exposure to sunlight, making production subject to a number of factors including weather conditions and the time of day.

From a materials point of view, the efficiency and power density of a thermochemical reactor increases with this reduction temperature. However, in systems in which the metal oxides are directly heated and reduced by highly concentrated solar energy, radiation losses back out through the aperture the concentrated solar flux is passing through increase with temperature, effectively limiting the temperature so as to maintain acceptable efficiencies. Temperatures around 1700° C. are desirable; however, such a temperature is not economically feasible with solar flux (and almost physically impossible).

SUMMARY

According to one aspect, a thermochemical labyrinth reactor includes a reduction zone having a first temperature and including a plurality of high temperature electric heaters and a reduction channel passing through the reduction zone. The reduction channel includes a first entrance and a first exit. The reactor also includes a reoxidation zone having a second temperature that is less than the first temperature. The reoxidation zone includes a reoxidation channel passing through the reoxidation zone, the reoxidation channel having a second entrance and a second exit. The reactor includes a recuperation zone connecting the reduction zone and the reoxidation zone, the recuperation zone having a first recuperation channel passing through the recuperation zone and a second recuperation channel passing through the recuperation zone, the first recuperation channel adjoining the second recuperation channel for a majority of the recuperation zone, the first recuperation channel being separated from the second recuperation channel by a plurality of windows for at least the majority of the recuperation zone. The plurality of windows is substantially transparent to infrared radiation, allowing an exchange of thermal radiation between the first recuperation channel and the second recuperation channel while preventing an exchange of gases between the first recuperation channel and the second recuperation channel. The reactor also includes a plurality of reactor plates composed of a reactive material, and a transit system including a track running through the reduction zone, the recuperation zone, and the reoxidation zone. The plurality of reactor plates are movably coupled to the track, and the transit system is configured to shuttle the plurality of reactor plates between the reduction zone and the reoxidation zone by moving the plurality of reactor plates along the track in a circuit running from the first exit to the second entrance via the first recuperation channel, through the second entrance to the second exit, then from the second exit to the first entrance via the second recuperation channel, finally returning to the first exit via the first entrance. The reactor includes a feedstock gas emitter in fluid communication with the reoxidation channel and configured to introduce a feedstock gas flowing in a gas flow direction toward the second entrance, the gas flow direction being opposite the movement of the plurality of reactor plates throughout the circuit. The reactor also includes a first gas extractor in fluid communication with the reoxidation channel and configured to extract a product gas as it moves away from the second exit in the gas flow direction, the product gas resulting from the feedstock gas being split by the reactive material oxidizing as it passes through the reoxidation channel. The reactor has a sweep gas emitter in fluid communication with the reduction channel and configured to introduce a sweep gas flowing through the reduction channel in the gas flow direction toward the first entrance, a second gas extractor in fluid communication with the reduction channel and configured to extract a sweep gas mixture as it moves away from the first exit in the gas flow direction, the sweep gas mixture includes the sweep gas and oxygen released by the reactor plates as they pass through the reduction channel and are reduced, and an insulating housing having an exterior. The reduction zone, the reoxidation zone, and the recuperation zone are all surrounded by the insulating housing, with the reoxidation zone being closer to the exterior of the insulating housing than the reduction zone. The high temperature electric heaters are each incandescent heat lamps having a filament within an envelope, the envelope composed of refractory material. The first temperature is at least 1600° C. and the second temperature is at least 1000° C.

Particular embodiments may comprise one or more of the following features. The plurality of windows within the recuperation zone may be composed of sapphire. The reactive material may be one of cerium oxide, iron oxide, and zinc oxide. The reduction zone may include a temperature profile, the temperature profile beginning with an entrance temperature proximate the first entrance, then rising to the first temperature proximate a midpoint of the reduction channel, then falling to an exit temperature proximate the first exit. The entrance temperature and the exit temperature may both be lower than the first temperature. The feedstock gas may include one of water and carbon dioxide. The product gas may include one of hydrogen and carbon monoxide. The reactor plates of the plurality of reactor plates each may have a width, a thickness, and a height. The width may be at least one order of magnitude larger than the thickness and the height may be at least two orders of magnitude larger than the thickness.

According to another aspect of the disclosure, a thermochemical labyrinth reactor includes a reduction zone having a first temperature and having a plurality of high temperature electric heaters and a reduction channel passing through the reduction zone, the reduction channel having a first entrance and a first exit. The reactor also includes a reoxidation zone having a second temperature that is less than the first temperature, the reoxidation zone also having a reoxidation channel passing through the reoxidation zone. The reoxidation channel includes a second entrance and a second exit. The reactor includes a recuperation zone connecting the reduction zone and the reoxidation zone, the recuperation zone having a first recuperation channel passing through the recuperation zone and a second recuperation channel passing through the recuperation zone, the first recuperation channel adjoining the second recuperation channel for a majority of the recuperation zone, the first recuperation channel being separated from the second recuperation channel by a plurality of windows for at least the majority of the recuperation zone, the plurality of windows being substantially transparent to infrared radiation, allowing an exchange of thermal radiation between the first recuperation channel and the second recuperation channel, the first recuperation channel in fluid communication with the second recuperation channel only through the reduction channel and the deoxidation channel. The reactor also has a plurality of reactor plates composed of a reactive material, and a transit system having a track running through the reduction zone, the recuperation zone, and the reoxidation zone. The plurality of reactor plates are movably coupled to the track, the transit system configured to shuttle the plurality of reactor plates between the reduction zone and the reoxidation zone by moving the plurality of reactor plates along the track in a circuit running from the first exit to the second entrance via the first recuperation channel, through the second entrance to the second exit, then from the second exit to the first entrance via the second recuperation channel, finally returning to the first exit via the first entrance. The reactor includes a feedstock gas emitter in fluid communication with the reoxidation channel and configured to introduce a feedstock gas flowing in a gas flow direction toward the second entrance, the gas flow direction being opposite the movement of the plurality of reactor plates throughout the circuit, a first gas extractor in fluid communication with the reoxidation channel and configured to extract a product gas as it moves away from the second exit in the gas flow direction, the product gas resulting from the feedstock gas being split by the reactive material oxidizing as it passes through the reoxidation channel, and an insulating housing. The reduction zone, the reoxidation zone, and the recuperation zone are all surrounded by the insulating housing.

Particular embodiments may comprise one or more of the following features. The reactor may include a sweep gas emitter in fluid communication with the reduction channel and configured to introduce a sweep gas flowing through the reduction channel in the gas flow direction toward the first entrance. The reactor may include a second gas extractor in fluid communication with the reduction channel and configured to extract a sweep gas mixture as it moves away from the first exit in the gas flow direction, the sweep gas mixture including the sweep gas and oxygen released by the reactor plates as they pass through the reduction channel and may be reduced. The insulating housing may include an exterior. The reoxidation zone may be closer to the exterior of the insulating housing than the reduction zone. The high temperature electric heaters may be incandescent heat lamps having a filament within an envelope, the envelope composed of refractory material. The reduction zone may include a temperature profile, the temperature profile beginning with an entrance temperature proximate the first entrance, then rising to the first temperature proximate a midpoint of the reduction channel, then falling to an exit temperature proximate the first exit. The entrance temperature and the exit temperature may both be lower than the first temperature. The first temperature may be at least 1600° C. and the second temperature may be at least 1000° C. The feedstock gas may include one of water and carbon dioxide. The product gas may include one of hydrogen and carbon monoxide. The reactor plates of the plurality of reactor plates each may have a width, a thickness, and a height. The width may be at least one order of magnitude larger than the thickness and the height may be at least two orders of magnitude larger than the thickness.

According to yet another aspect of the disclosure, a method for operating a thermochemical labyrinth reactor includes moving a plurality of reactor plates around a circuit within the thermochemical labyrinth reactor, the reactor includes a reduction zone, a reoxidation zone, and a recuperation zone, the circuit running from a first entrance to a first exit of a reduction channel passing through the reduction zone, then running from the first exit through a first recuperation channel passing through the recuperation zone to a second entrance of a reoxidation channel passing through the reoxidation zone, then running from the second entrance to a second exit of the reoxidation channel, then running from the second exit through a second recuperation channel also passing through the recuperation zone to the first entrance, each plate of the plurality of reactor plates composed of a reactive material. The method also includes reducing the reactive material by heating the reduction channel to a first temperature using high temperature electric heaters in the reduction zone, causing oxygen to be released into the reduction channel, as well as flowing a sweep gas through the reduction channel in a gas flow direction toward the first entrance, forming a sweep gas mixture including the sweep gas and the oxygen released by the reactive material. The gas flow direction is opposite the motion of the plurality of reactor plates throughout the circuit. The method includes extracting the sweep gas mixture as it moves away from the first exit in the gas flow direction, and oxidizing the reactive material within the reoxidation channel by flowing a feedstock gas through the reoxidation channel in the gas flow direction toward the second entrance as the reactive material moves through the reoxidation channel at a second temperature that is less than the first temperature, the feedstock gas splitting as the reactive material is oxidizing, releasing a product gas. The method also includes extracting the product gas as it moves away from the second exit in the gas flow direction, and recovering heat from the reactive material by returning the reactive material from the reoxidation zone to the reduction zone via the second recuperation channel and exposing the reactive material in the second recuperation channel to thermal radiation from the reactive material in the first recuperation channel through a plurality of windows, the second recuperation channel adjoining the first recuperation channel for a majority of the recuperation zone, the second recuperation channel being separated from the first recuperation channel by the plurality of windows for at least the majority of the recuperation zone with the windows being substantially transparent to infrared radiation and allowing an exchange of thermal radiation between the first recuperation channel and the second recuperation channel while preventing an exchange of gases between the first recuperation channel and the second recuperation channel.

Particular embodiments may comprise one or more of the following features. The high temperature electric heaters may be incandescent heat lamps having a filament within an envelope, the envelope composed of refractory material. The thermochemical labyrinth reactor may include an insulating housing having an exterior. The reoxidation zone, the recuperation zone, and the reduction zone may be all enclosed within the insulating housing with the reoxidation zone closer to the exterior of the insulating housing than the reduction zone. Heating the reduction channel to the first temperature may include establishing a temperature profile within the reduction zone, the temperature profile beginning with an entrance temperature proximate the first entrance, then rising to the first temperature proximate a midpoint of the reduction channel, then falling to an exit temperature proximate the first exit. The entrance temperature and the exit temperature may be both lower than the first temperature.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1A:
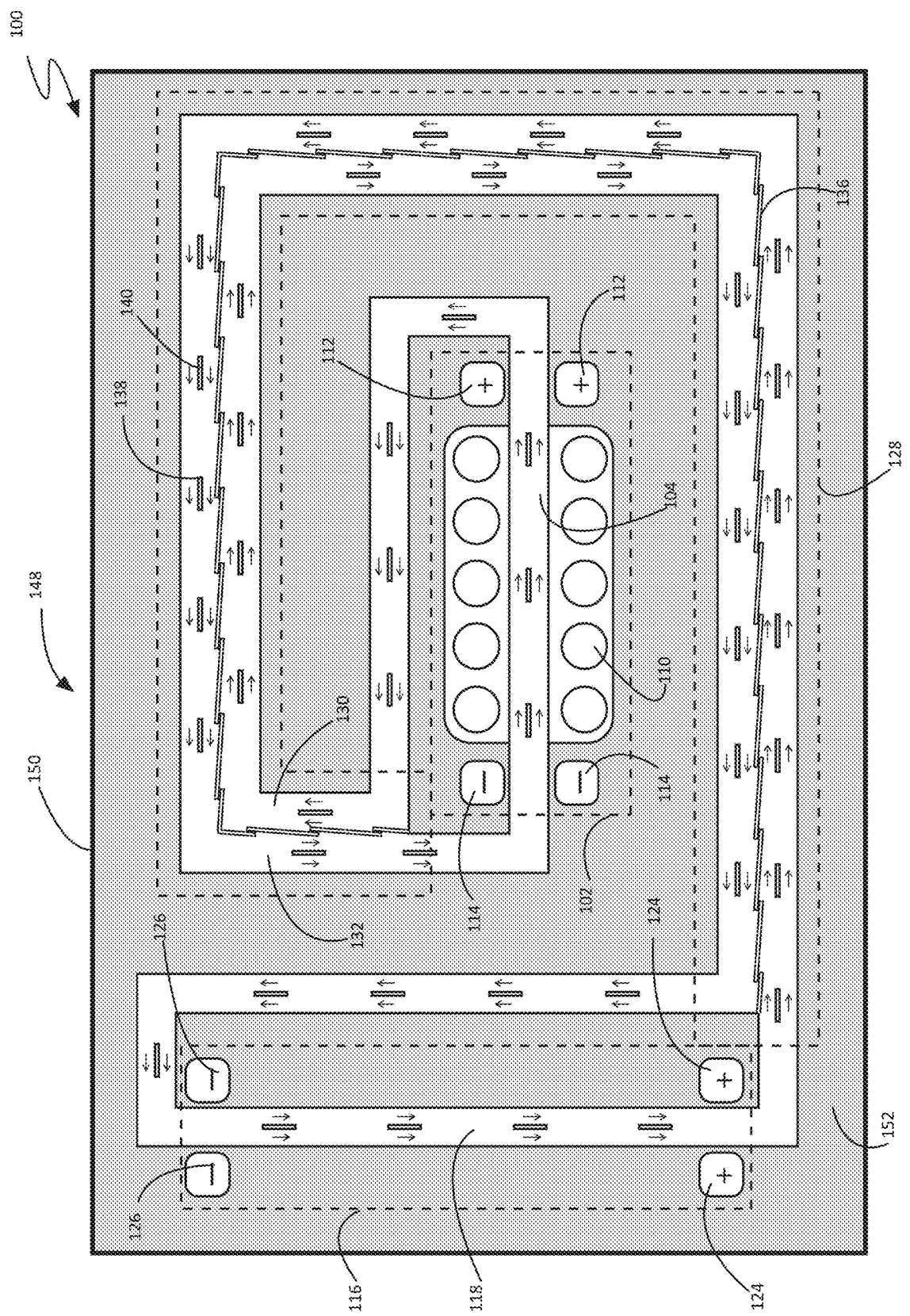
FIG. 1A is a schematic view of a two-step thermochemical labyrinth reactor.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Thermochemical reactors can provide an effective means for water splitting and carbon dioxide splitting. These reactors are able to produce energized chemicals (e.g., hydrogen and carbon monoxide), which can subsequently be used in other chemical reactions (e.g., to reduce, add functionality, hydroprocess, etc.) or from which other chemicals can be made (e.g., hydrocarbon fuels, ammonia, etc.). These reactors employ thermochemical cycles, which combine heat sources with chemical reactions to split bonds and generate a desired product stream.

In order for thermochemical reactors to be economically competitive with other competing technologies, they must be efficient while remaining sufficiently inexpensive to manufacture and operate. In water splitting, the main competing technologies are steam-methane reforming (which is not renewable) and electrolysis. The advantages thermochemical reactors may provide over electrolysis are a potentially much lower capital cost and improved robustness to impurities in the feedstock water. In carbon dioxide splitting, thermochemical reactors are the most advanced technology, and have found application in carbon dioxide re-utilization.

One of the ways that the operating expense of thermochemical reactors is kept down is through the use of renewable energy to provide the necessary heat. In some cases, conventional thermochemical reactors have harnessed direct, concentrated solar flux to provide the needed heat for splitting. However, such implementations are accompanied by a number of difficulties. Like other solar technologies, the use of concentrated solar flux is subject to the availability of direct exposure to sunlight, making production subject to a number of factors including weather conditions and the time of day.

Additionally, using concentrated solar flux to reduce the metal oxide has an inherent temperature limit, due to radiating losses back out through the aperture the solar flux is passing through. The efficiency and power density of a thermochemical reactor increases with this reduction temperature. Temperatures around 1700° C. are desirable; however, such a temperature is not economically feasible with solar flux (and almost physically impossible).

Contemplated herein is a two-step thermochemical labyrinth reactor, powered by electricity, for water and carbon dioxide splitting. Unlike conventional thermochemical reactors, the thermochemical labyrinth reactors contemplated herein are able to harness electrical heating in an efficient and economical way. Expense of operation and manufacture are kept down through the use of a modular design, inexpensive materials, and adaptability to work in conjunction with various renewable energy sources.

Furthermore, the use of electric heating instead of concentrated solar flux provides a number of engineering advantages. Conventional thermochemical reactors employing concentrated solar flux inherently have to leave the reactive material somewhat exposed, or at least exposed enough that it can be reached by the solar flux. This limits the degree to which the reduction chamber can be shielded, and thus limits the efficiency and the ability to mitigate thermal losses. Advantageously, the use of electric heating permits the thermochemical labyrinth reactors contemplated herein to position the hottest part of the reactor, the reduction zone, near the center of the reactor, surrounding it with insulation as well as the other zones of the labyrinth, reducing loss and also reclaiming heat that would otherwise be wasted. This will be discussed more with respect to a recuperation or transit zone, within the labyrinth.

Compared to existing thermochemical reactor designs, the reactors contemplated herein are able to operate at higher temperatures with greater efficiency. The temperatures used for thermal reduction in conventional reactors that use concentrated solar flux are limited due to the unavoidable radiation losses through the reactor aperture. Operating at 1700° C., for example, would be extremely inefficient and not economically practical in a conventional thermochemical reactor. According to various embodiments, the reactors contemplated herein are able to thermally reduce a reactive material at temperatures exceeding 1600° C. The use of electric heating lamps means the reactor can afford to go to temperatures that are practically unobtainable with concentrated solar flux, and even if they could be reached, the losses through the aperture would be massive. These higher temperatures mean the labyrinth reactors contemplated herein can provide a greater power density and higher efficiency than conventional reactors.

Another advantage the thermochemical labyrinth reactors contemplated herein have over conventional thermochemical reactors includes being compatible with a wider range of reactive materials. While the following discussion of various embodiments will be focused on using a metal oxide as the reactive material (e.g., cerium oxide), it should be noted that other metal oxides, such as iron oxide, and many other oxides and reactive materials may be substituted. Those skilled in the art will recognize that changing the reactive material may also open up applications for the thermal reduction of feedstocks other than water and carbon dioxide, resulting in different products.

It should also be noted that while embodiments of the thermochemical labyrinth reactor using electric heating are superior to solar flux reactors for many reasons, the labyrinth reactors can be adapted for use with solar flux. For example, in one embodiment, the reduction zone may be relocated to the outer edge of the reactor, where the reactive material can be exposed to solar flux through an aperture before moving on through the labyrinth and the gas counterflows that will be discussed in greater detail below. While the use of solar flux may not outperform the electric embodiments, the contemplated methods of heat reclamation and use of gas counterflows provide several advantages over traditional solar flux-powered thermochemical reactors.

Figure 1B:
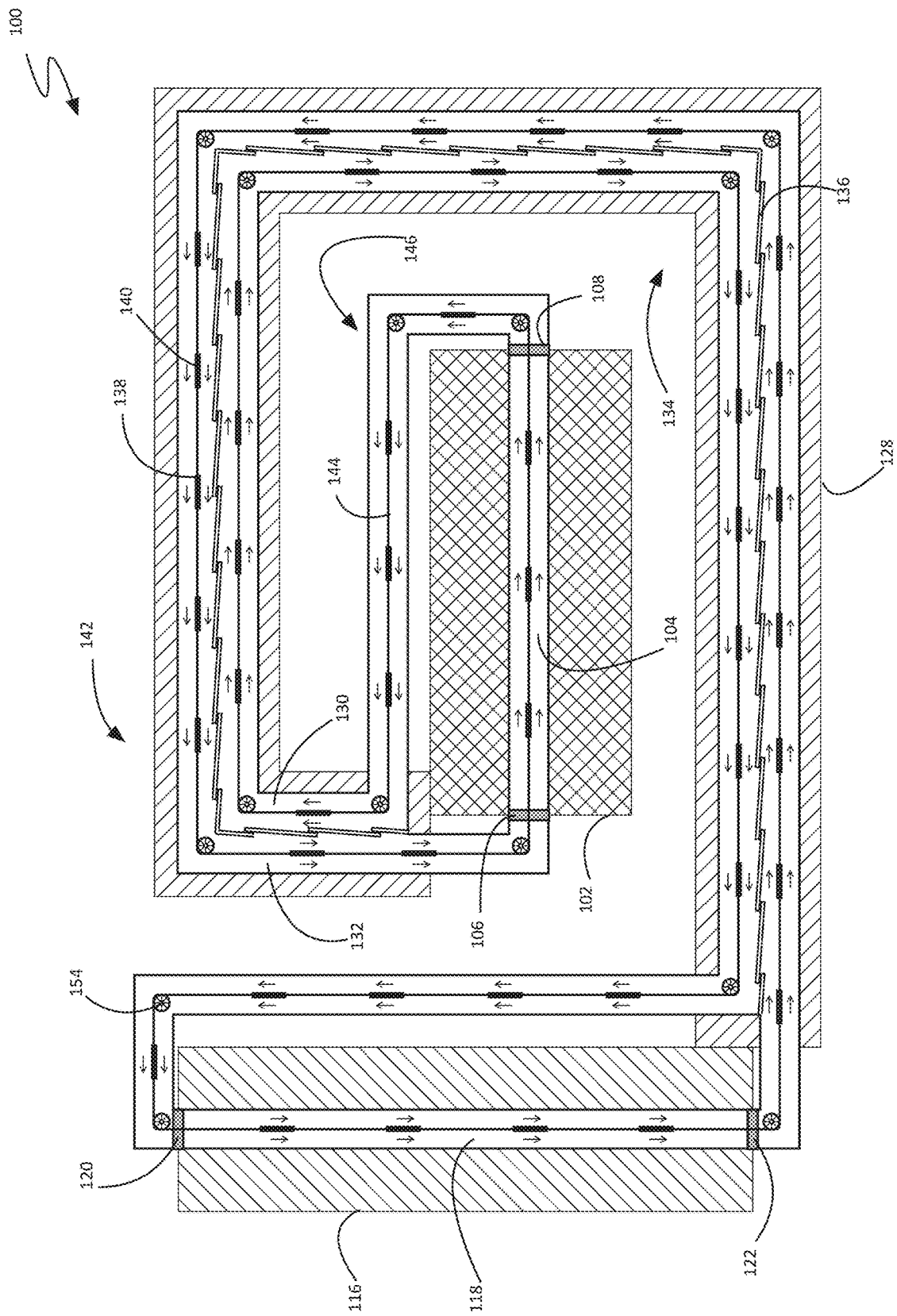
FIG. 1B is a schematic view of the transit system of the reactor of FIG. 1A.

FIG. 1A is a schematic view of a non-limiting example of a two-step thermochemical labyrinth reactor 100 (hereinafter labyrinth reactor 100 or reactor 100). FIG. 1B is a schematic view of the transit system of the reactor 100 of FIG. 1A. As shown, the reactor 100 comprises an insulating housing 148 filled with a thermal insulation 152. Winding through the insulation is a pathway (e.g., the labyrinth) forming a circuit 146, with a reduction zone 102 and a reoxidation zone 116, and a recuperation zone 128 that connects the other two zones. Each zone will be discussed in turn, below. Not shown in FIGS. 1A and 1B are auxiliary components which may include, but are not limited to, feedstock sources, vacuum systems, gas preheating systems, product separation systems, process control systems, electrical power sources, and the like.

The thermochemical process performed by the contemplated labyrinth reactor 100 is centered around the successive and repetitive oxidation and reduction of a reactive material 140. The reactive material 140 of the labyrinth reactor 100, according to various embodiments, is in the form of plates 138 that move along a track 144, traveling through the winding channels, passing from one zone to another. The geometry of the reactor plates 138 will be discussed in greater detail with respect to FIG. 3, below. The transit system 142 will be discussed in the context of FIG. 1B.

According to various embodiments, the reactive material 140 is a metal oxide. Advantageous over conventional thermochemical reactors, the reactor 100 contemplated herein is able to operate with a wide range of reactive $MO_x$ materials. As a specific, non-limiting example, in one embodiment the reactive material 140 is cerium oxide. It is important to note that while the following discussion will be in the context of embodiments of the reactor 100 making use of the non-stoichiometric (i.e., partially reduced) cerium (IV) oxide thermochemical cycle, other embodiments may be adapted for use with other metal oxides or other reactive material 140 including, but not limited to, iron oxide and compounds thereof.

The reduction zone 102 is the region of the labyrinth reactor 100 where the reactive material 140 (i.e., the reactor plates 138) is reduced. In the context of the present description and the claims that follow, a zone is a region within the reactor 100 where a particular part of the reactor cycle takes place. A zone may comprise regions filled with an insulating material 152 (or a vacuum, in some embodiments), and should not be assumed to be an empty void. Zones have at least one channel passing through them, allowing reactor plates 138 to enter from or exit to a neighboring zone.

As shown, the reduction zone 102 comprises a reduction channel 104 passing through the reduction zone 102 and through which reactor plates 138 travel as they are being reduced. This reduction channel 104 is similar to the reduction cavity of a conventional thermochemical reactor. An important difference between conventional reduction cavities using solar flux, and the reduction channel 104 and reduction zone 102 as a whole, is that the reduction zone 102 does not have an aperture to allow solar flux to enter. This gives the contemplated electric reactor 100 a distinct advantage over conventional solar flux reactors 100 when operating at the contemplated high temperatures, as previously discussed. The reduction channel 104 comprises a first entrance 106 connected to the second recuperation channel 132, and a first exit 108 connected to the first recuperation channel 130.

According to various embodiments, the reduction channel 104 is in thermal contact with a plurality of high temperature electric heaters 110. In some embodiments, the reduction channel 104 may be surrounded by aid heaters 110. Using electric heating makes it possible to use a simple reactor design that is agnostic to the source of power, making it compatible with numerous renewable sources of electricity including, but not limited to, solar, hydroelectric, wind, thermoelectric, and the like. According to various embodiments, these high temperature electric heaters 110 may be heat lamps, which transfer energy to the reactive material 140 in the reduction zone 102 through electromagnetic radiation. The use of heat lamps will be discussed in greater detail with respect to FIG. 5, below.

In some embodiments, the reduction zone 102 may utilize a sweep gas to improve the reduction occurring within the reduction channel 104 and help move released oxygen out of the reduction channel 104. The reduction zone 102 may comprise one or more sweep gas emitters 112 and one or more gas extractors 114 (here referred to as a second gas extractor 114 to distinguish it from the gas extractor(s) used in the reoxidation zone 116). The sweep gas emitter 112 is in fluid communication with the reduction channel 104. According to various embodiments, the sweep gas is introduced to the reduction channel 104 near the first exit 108, where it mostly flows through the reduction channel 104 toward the first entrance 106, opposite the direction the reactor plates 138 are moving. One or more second gas extractors 114 are in fluid communication with the reduction channel 104, near the first entrance 106. The use of sweep gas will be discussed in greater detail with respect to FIG. 2, below.

The reoxidation zone 116 is the region of the labyrinth reactor 100 where the reactive material 140 (i.e., the reactor plates 138) is oxidized in the process of splitting bonds within a feedstock. As shown, the reoxidation zone 116 comprises a reoxidation channel 118 through which reactor plates 138 pass as they are being exposed to a feedstock gas and oxidized. The reoxidation channel 118 passes through the reoxidation zone 116 and comprises a second entrance 120 connected to the first recuperation channel 130, and a second exit 122 connected to the second recuperation channel 132.

As shown, the reoxidation zone 116 comprises one or more feedstock gas emitters 124 and one or more gas extractors 126 (here referred to as a first gas extractor 126 to distinguish it from the gas extractor(s) used in some embodiments of the reduction zone 102). The feedstock gas emitter 124 is in fluid communication with the reoxidation channel 118. According to various embodiments, the feedstock gas is introduced to the reoxidation channel 118 near the second exit 122, where it mostly flows through the reoxidation channel 118 toward the second entrance 120, opposite the direction the reactor plates 138 are moving. One or more first gas extractors 126 are in fluid communication with the reoxidation channel 118, near the second entrance 120. Feedstock gases will be discussed in greater detail with respect to FIG. 2, below.

The recuperation zone 128 is the region of the labyrinth reactor 100 connecting the reduction zone 102 and the reoxidation zone 116, and also where some of the heat used to bring the reactive material 140 up to a reducing temperature may be recaptured, increasing the efficiency of the reactor 100. According to various embodiments, the recuperation zone 128 is what makes the contemplated thermochemical reactor 100 a "labyrinth" reactor. While the non-limiting examples shown in FIGS. 1A, 1B, and 2 have a recuperation zone 128 with a relatively simple geometry, it should be known that in other embodiments, the channels of the recuperation zone 128 may be significantly more maze-like. As will be explained in the context of FIG. 2, the labyrinth-like shape of the recuperation zone 128 provides a number of benefits not available to conventional reactor designs.

Unlike the other zones, the recuperation zone 128 has two channels passing through it, a first recuperation channel 130 and a second recuperation channel 132. As shown, the first recuperation channel 130 adjoins the second recuperation channel 132 for at least a majority of the recuperation zone 128. More specifically, the first recuperation channel 130 and the second recuperation channel 132 are parallel and share a wall for at least a majority of the recuperation zone 128. It is through this shared wall that heat can be reclaimed.

According to various embodiments, the first recuperation channel 130 is separated from the second recuperation channel 132 by a plurality of windows 136, for at least a majority 134 of the recuperation zone 128. These windows 136 are substantially transparent to infrared radiation. In the context of the present description and the claims that follow, substantially transparent means that the windows are sufficiently transparent to infrared radiation that thermal radiation from the hotter, recently reduced reactor plates 138 travelling in the first recuperation channel 130 toward the reoxidation zone 116 is able to pass through the windows 136 and heat up the colder, recently oxidized reactor plates 138 travelling in the second recuperation channel 132 toward the reduction zone 102. The recuperation zone 128 and its channels will be discussed in greater detail with respect to FIGS. 2 and 4, below.

According to various embodiments, the reduction zone, the reoxidation zone, and the recuperation zone are all surrounded by an insulating housing 148. The insulating housing 148 is thermally insulated, improving the energy efficiency of the reactor 100. In some embodiments, the thermal insulation 152 may comprise insulating materials. In other embodiments, the insulating housing 148 may make use of evacuated, insulating walls. In still other embodiments, the insulating housing 148 may be insulated using any other method known in the art.

Advantageous over conventional thermochemical reactors heated with concentrated solar flux, the reduction zone 102 of the reactor 100 does not have an aperture to let in solar flux. Losses through an aperture are difficult to mitigate; that difficulty rapidly increases with temperature. In the contemplated reactor 100, heat loss may be reduced with the use of additional or more efficient thermal insulation 152. Not having to deal with losses through an aperture allows the reactor 100 to operate at temperatures practically impossible to employ with concentrated solar flux in conventional reactors.

Additionally, by placing the reduction zone 102 in the center of the reactor 100, it is further insulated by all of the structure standing between it and the external environment. According to various embodiments, the reoxidation zone 116 is closer to the exterior surface 150 of the housing 148 than the reduction zone 102. In this context, the distances being compared are the smallest distances between the external surface 150 and a point within the respective zone.

FIG. 1B is a schematic view of the transit system 142 of the reactor 100 of FIG. 1A. The various zones are shaded to put the transit system 142 into context. As shown, the transit system 142 comprises a track 144 running through the reduction zone 102, the recuperation zone 128, and the reoxidation zone 116, with the plurality of reactor plates 138 movably coupled to the track 144. In the context of the present description and the claims that follow, a track 144 refers to a structure that loops through the various channels to form a circuit, and to which the plurality of reactor plates 138 are movably coupled. In some embodiments, the plates 138 may move around the circuit on a motionless track 144, while in other embodiments the plates 138 may be movably coupled to the track 144 through another structure (e.g., a conveyance that is itself movably coupled to the track 144).

The transit system 142 is configured to shuttle the reactor plates 138 between the reduction zone 102 and the reoxidation zone 116 by moving them along the track 144 in a circuit 146. As shown in FIG. 1B, in some embodiments, the circuit 146 runs from the first exit 108 (of the reduction zone 102) to the second entrance 120 (of the reoxidation zone 116) via the first recuperation channel 130, through the second entrance 120 to the second exit 122 in the reoxidation zone 116, then from the second exit 122 to the first entrance 106 (of the reduction zone 102) via the second recuperation channel 132, finally returning to the first exit 108 via the first entrance 106. In other embodiments, this pathway may be reversed The reactor plates 138 may be moved around the circuit 146 in a variety of ways. In some embodiments, the reactor plates 138 (or a structure to which they are coupled) may be pulled around the circuit by some sort of line (e.g., belt, chain, cable, etc.) that is tensioned between a series of rotating elements 154 (e.g., wheels, gears, etc.) at the various turns within the circuit 146. As an option, in some embodiments, one or more of the rotating elements 154 may be coupled to a motor or some other device configured to pull the line in a continuous fashion. In other embodiments, the reactor plates 138 may slide or roll on the track 144 or rail, and be driven to move through the circuit 146 by an interaction directly with the reactor plates 138 at one or more specific locations (e.g., spinning wheels, turning gears, etc.).

According to various embodiments, the speed with which the reactor plates 138 move around the circuit 146 may depend on a number of variables including, but not limited to, temperature, reactive material 140, feedstock gasses 216, sweep gasses 212, gas flow rate, and the like. The size of the circuit 146 and the different zones is based, at least in part, on a number of factors including, but not limited to, relative reaction rates for the reduction and reoxidation zones 116, reactor plate speed, mass transfer rates, heat transfer rates, and the like. As a specific example of a reactor plate movement rate, in one embodiment, the reactor plates 138 move roughly 1 cm/s.

Figure 2:
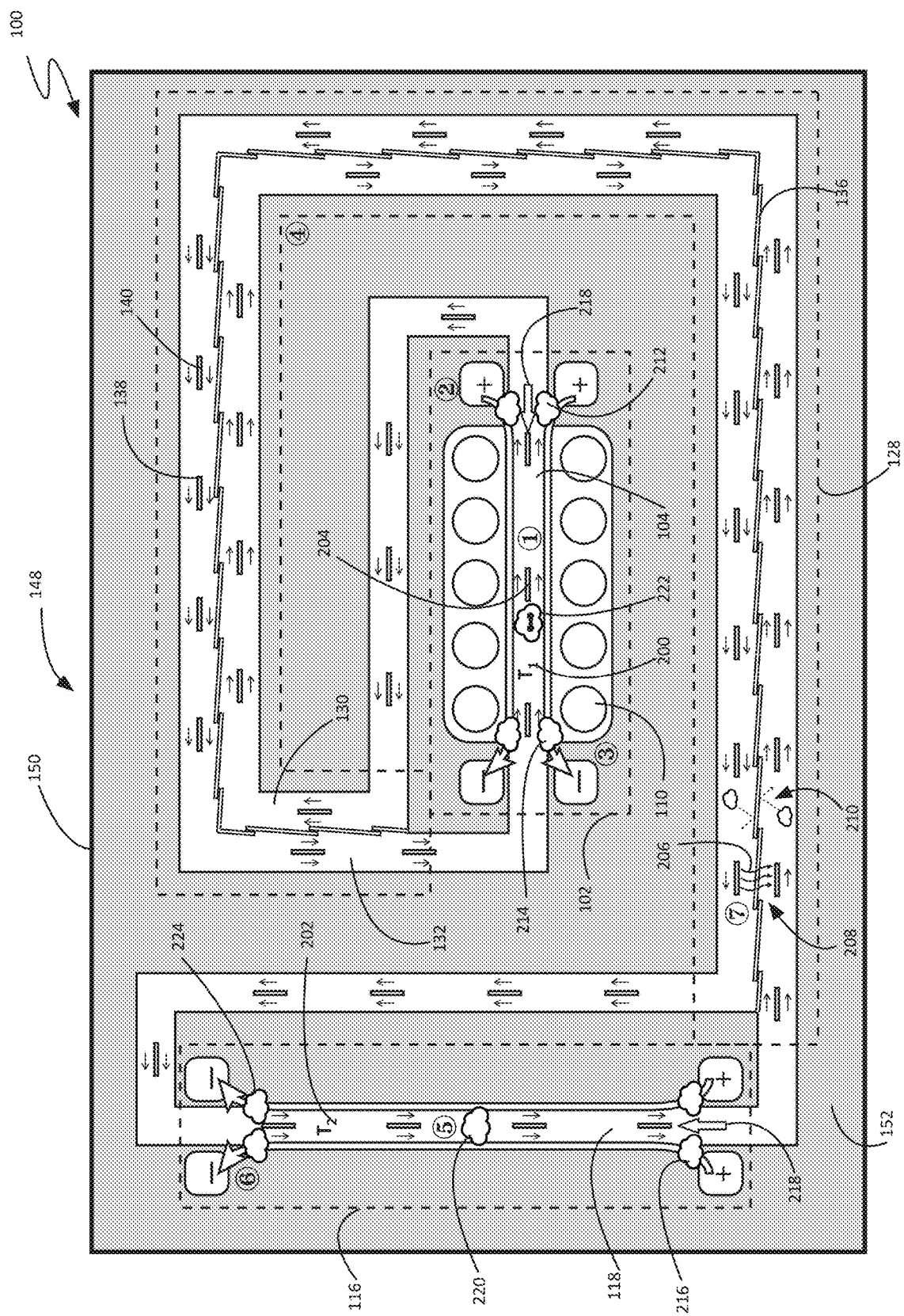
FIG. 2 is a process view of a two-step thermochemical process in a two-step thermochemical labyrinth reactor.

FIG. 2 is a process view of a non-limiting example of a two-step thermochemical process implemented in a two-step thermochemical labyrinth reactor 100. According to various embodiments, the reduction zone 102, the reoxidation zone 116, and the recuperation zone 128 of the contemplated labyrinth reactor 100 all work together to continuously carry out the two stages of the two-step thermochemical cycle contemplated herein. While this discussion will begin in the reduction zone 102, it should be noted that, according to various embodiments, all steps of this process are occurring at the same time as the reactor plates 138 continuously circulate through the circuit 146.

Starting in the reduction zone 102, the first step of the contemplated two-step thermochemical cycle for water and/or carbon dioxide splitting begins with heating the reactive material 140. See 'circle 1'. As the reactor plates 138 move through the reduction zone 102 via the reduction conduit 104, they are heated by the plurality of high temperature electric heaters 110 (e.g., heat lamps, etc.). This heating results in the thermal reduction of the reactive material 140, causing oxygen 222 to be released into the reduction channel 104.

The reduction channel 104 is heated to a first temperature 200 by the high temperature electric heaters 110. In some embodiments, the heaters 110 may be driven such that the entire reduction channel 104 is held at the first temperature 200, allowing for some slight temperature variations near the first entrance 106 and first exit 108 because the reduction channel 104 is not a sealed chamber, and the gas within is in motion. In other embodiments, the reduction channel 104 may be heated with the high temperature electric heaters 110 in such a way that a temperature profile is deliberately created. In some embodiments, the temperature profile may have a first temperature 200 at or near a midpoint 204 of the reduction channel 104. The use of temperature profiles will be discussed in greater detail with respect to FIG. 6, below.

In one embodiment, the first temperature 200 may be at least 1500° C., in another embodiment, the first temperature 200 may be at least 1600° C., and in still another embodiment, the first temperature 200 may be at least 1700° C. In other embodiments, the first temperature 200 may be higher than 1700° C. The temperatures used within the contemplated labyrinth reactor 100 may be selected to be high enough to achieve greater efficiency than conventional reactors, while avoiding problematic phase changes within the reactive material 140 that are drastic enough to lead to mechanical failures within the plates 138.

According to some embodiments, a sweep gas 212 is introduced to the reduction zone 102 by at least one sweep gas emitter 112, to remove the released oxygen 222 from the reduction channel 104 and facilitate further reduction. See 'circle 2'. The sweep gas 212 is an inert gas that does not otherwise react with the reactive material 140, according to various embodiments. For example, the sweep gas 212 may be nitrogen.

As shown, the sweep gas 212 is introduced as a counter flow, moving through the reduction channel 104 such that the gas flow direction 218 is opposite the direction the reactor plates 138 are being transported by the transit system 142. This is done to maximize the extent of the reduction occurring within the reduction zone 102. Such an advantage is not available in thermochemical reactors where the reactive material 140 does not move with respect to the heat source. According to various embodiments, the sweep gas 212 is injected into the reduction channel 104 at or near the first exit 108 of the reduction channel 104 by one or more sweep gas emitters 112. The sweep gas 212 flows in the gas flow direction 218 towards the first entrance 106 of the reduction channel 104. The sweep gas 212 mixes with the oxygen 222 released due to the reduction of the reactive material 140, forming a sweep gas mixture 214. The sweep gas mixture 214 may also comprise some residual feedstock gas 216 that is injected into the reoxidation zone 116, in some embodiments.

The sweep gas mixture 214 is extracted from the reduction channel 104 by one or more gas extractors 114 (referred to as second gas extractors 114 to be distinct from the first gas extractors 126 of the reoxidation zone 116) as the sweep gas mixture 214 moves away from the first exit 108. See 'circle 3'. In some embodiments, this extraction may occur at or near the first entrance 106 of the reduction channel 104.

As mentioned above, between the reduction zone 102 and the reoxidation zone 116 is the labyrinth (i.e., the recuperation zone 128) through which the reactor plates 138 travel between the two steps of the thermochemical cycle, reduction and oxidation. The recuperation zone 128 has two channels, with reactor plates 138 traveling between the two other zones in opposite directions. The reactor plates 138 that were just reduced within the reduction zone 102 are subsequently transported to the reoxidation zone 116, traveling through the first recuperation channel 130. See 'circle 4'.

The second step of the two-step thermochemical cycle is the reoxidation of the reactive material 140 and the splitting of a feedstock gas 216 (e.g., water in the form of steam, carbon dioxide, etc.) that is put in contact with the reactive material 140. This occurs in the reoxidation zone 116, within the reoxidation channel 118. See 'circle 5'.

According to various embodiments, the feedstock gas 216 is introduced to the reoxidation zone 116 by at least one feedstock gas emitter 124. Like the sweep gas 212 of the reduction zone 102, the feedstock gas 216 is introduced to the reoxidation zone 116 as a counterflow, moving through the reoxidation channel 118 such that the gas flow direction 218 is opposite the direction the reactor plates 138 are being transported by the transit system 142, according to various embodiments.

This is done to maximize the extent of the oxidation of the reactive material 140 occurring within the reoxidation zone 116, and the amount of product gas 220 released as the feedstock gas 216 is split. According to various embodiments, the feedstock gas 216 is injected into the reoxidation channel 118 at or near the second exit 122 of the reoxidation channel 118 by one or more feedstock gas emitters 124. The feedstock gas 216 flows in the gas flow direction 218 towards the second entrance 120 of the reoxidation channel 118.

The introduction of the feedstock gas 216 (here, steam) to the partially reduced reactive material 140 results in the removal of oxygen 222 from the feedstock 216, effectively splitting it to yield a product gas 220 (e.g., hydrogen, carbon monoxide, etc.). In a specific, non-limiting example, this takes at least some of the partially reduced cerium oxide to back to cerium(IV) oxide, in preparation for the next cycle. Those skilled in the art will recognize that other feedstock gasses 216, and reactive materials 140, may be used in other embodiments.

Residual feedstock gas 216 mixes with the product gas 220 released due to the splitting of the feedstock gas molecules caused by the oxidation of the reactive material 140, forming a product gas mixture 224. The product gas mixture 224 may also comprise some residual sweep gas 212 that is injected into the reduction zone 102, in some embodiments.

The reoxidation zone 116 operates at a second temperature 202, according to various embodiments, and that second temperature 202 is lower than the first temperature 200. In some embodiments, the second temperature 202 may be at least 1000° C. for cerium oxide. Those skilled in the art will recognize that the first and second temperatures 202 may change, depending on the reactive material 140 being used.

The product gas mixture 224 is extracted from the reoxidation channel 118 by one or more gas extractors 126 (referred to as first gas extractors 126 to be distinct from the second gas extractors 114 of the reduction zone 102) as the product gas mixture 224 moves away from the second exit 122. See 'circle 6'. In some embodiments, this extraction may occur at or near the second entrance 120 of the reoxidation channel 118. The reactor plates 138 leave the reoxidation zone 116 oxidized and ready for another trip through the circuit 146.

As mentioned above, between the reduction zone 102 and the reoxidation zone 116 is the recuperation zone 128, a labyrinthine pair of parallel channels through which the reactor plates 138 travel between the two steps of the thermochemical cycle. For at least a majority of the recuperation zone 128 the reactor plates 138 are passing in two directions along parallel, adjoining channels. Between these two channels are windows 136 that allow the exchange of thermal radiation 208. According to various embodiments, these windows 136 are composed of material that is substantially transparent to infrared radiation 206. Exemplary materials include, but are not limited to, alumina and sapphire.

Using these windows 136 to separate the first recuperation channel 130 from the second recuperation channel 132 allows for the exchange of radiative heat without allowing any exchange of gases 210, leaving the reduced reactor plates 138 reduced and the oxidized reactor plates 138 oxidized. In other words, the first recuperation channel 130 is in fluid communication with the second recuperation channel 132 only through the reduction channel 104 and the reoxidation channel 118.

This architecture allows for the reclamation of some of the heat used to heat the reactive material 140 to the reduction temperature (i.e., the first temperature 200) within the reduction zone 102. See 'circle 7'. As the reduced reactor plates 138 leave the reduction zone 102, they are passing by the reoxidized reactor plates 138 headed towards the reduction zone 102. The reduced reactor plates 138 radiate some of their heat through the windows 136, heating up the colder oxidized reactor plates 138 before getting to the much hotter reduction zone 102, and cooling the reduced reactor plates 138 before getting to the reoxidation zone 116, which is at the second temperature 202, which is less than the first temperature 200. This allows for the recovery of some of the heat, increasing the overall efficiency of the reactor 100, according to various embodiments.

Figure 3:
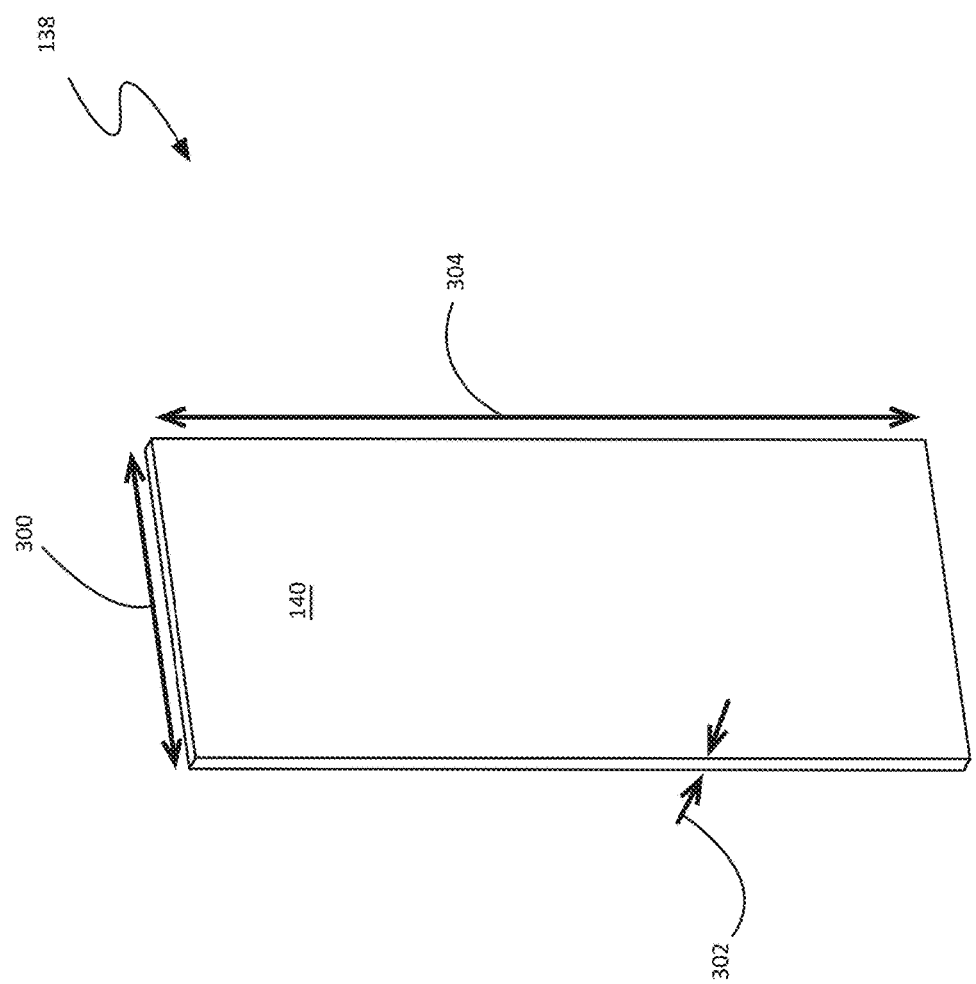
FIG. 3 is a perspective view of a reactor plate.

FIG. 3 is a perspective view of a non-limiting example of a reactor plate 138. While the term 'plate' is being used to describe the discrete pieces of reactive material 140 within the reactor 100, it should be understood that the use of this term does not imply any limitations on the geometry of the plate 138. In the context of the present description and the claims that follow, a reactor plate 138 is simply a discrete piece of solid reactive material 140 whose size and shape are chosen for efficient and durable operation of the contemplated reactor 100. According to various embodiments, the reactor plates 138 are sized and shaped to be strong enough to withstand the thermal stresses associated with the thermochemical cycle contemplated herein, while also exhibiting good heat transfer and good oxygen ion transport in and out of the reactor plate 138.

According to various embodiments, the reactor plates 138 may have the form of a thin slab, having a width 300, a thickness 302, and a height 304. In some embodiments, the reactor plates 138 may be very thin in relation to their width 300, and both dimensions may be much smaller than the height 304. As a specific example, in one embodiment, the width 300 of each reactor plate 138 may be at least one order of magnitude larger than the thickness 302, and the height 304 may be at least two orders of magnitude larger than the thickness 302. As another specific example, in another embodiment, the thickness 302 of the reactor plates 138 may be less than 1 mm. In some embodiments, the reactor plate 138 may comprise macroscopic porosity, which may allow for the use of thicker slabs without sacrificing performance, due at least in part to the increased contact with the sweep gas 212 and feedstock gas 216.

Figure 4:
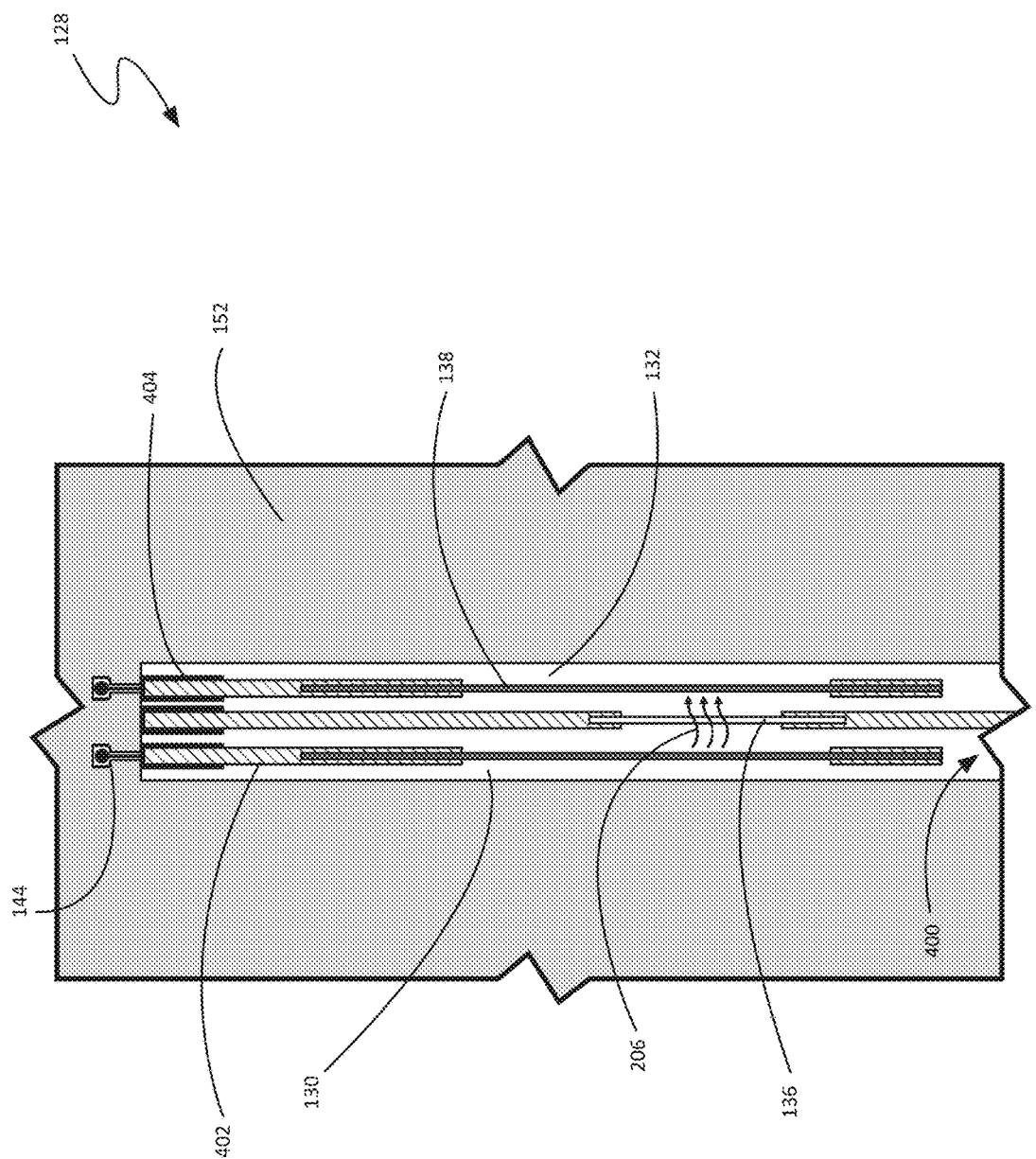
FIG. 4 is a cross-sectional view of a recuperation zone.

FIG. 4 is a cross-sectional view of a non-limiting example of a recuperation zone 128. This cross-section also includes two reactor plates 138 that are passing each other in the recuperation zone 128 in the adjoining channels. As shown, in the double channel portion of the recuperation zone 128 (which takes up a majority of the zone, according to various embodiments), the reactor plates 138 are separated from each other by a window 136 that allows for heat exchange through radiation, but prevents gas exchange between the first recuperation channel 130 and the second recuperation channel 132.

In some embodiments, the windows 136 may be mounted in individual frames. In other embodiments, including the non-limiting example shown in FIGS. 1A and 1B, neighboring windows may be coupled to each other, allowing for the use of easily manufactured panels of the window material (e.g., sapphire, alumina, etc.) while also maximizing the opportunity for the desired thermal exchange 208.

As shown, in some embodiments, the reactor plates 138 may hang from the track 144, which may provide a surface along which the reactor plates 138 can move, or which itself may be moving along the circuit 146. In other embodiments, the reactor plates 138 may sit on top of the track 144. In still other embodiments, the track 144 may comprise supports above and below the reactor plates 138.

In some embodiments, channels may comprise a void 400 beneath the region through which the reactor plates 138 travel, which may function as a graveyard, of sorts. In the event of a reactor plate 138 coming loose or breaking, it would fall into the graveyard rather than obstruct the movement of the other reactor plates 138. Some embodiments may employ a graveyard zone beneath the entire channel, while other embodiments may limit the graveyard to particular regions of the circuit 146 (e.g., the recuperation zone, etc.), while still others may not have a graveyard at all.

A single reactor plate 138 halting in the circuit 146, or becoming jammed, may obstruct the entire collection of reactor plates 138. According to various embodiments, measures may be taken to reduce the likelihood that a failure in one reactor plate 138 will result in a domino effect, impacting the entire reactor 100. For example, some embodiments may employ a graveyard, as described above. Some embodiments may configure a coupling between the reactor plate 138 and the transit or support structure such that the coupling is strong enough to hold and/or pull the reactor plates 138 under normal operation, but can release when experiencing resistance.

In some embodiments, the reactor plates 138 may be coupled to the track 144 in stages. The bare reactive material 140 may be coupled to an inert refractory material 402, such as a ceramic composite, close to the point of coupling with the track 144 (e.g., an end) and away from the portion of the reactor plate 138 directly exposed to the heaters 110 within the reduction zone 102. That refractory material 402 may itself be coupled to a metal coupling 404 which is attached to, or otherwise engages with, the track 144 or other part of the transit system 142. Such an arrangement may help avoid unwanted interactions with the reactive material 140, as well as help reduce strains caused by mismatched thermal expansions. In other embodiments, the reactor plates 138 may each be coupled directly to the track 144 through a single coupling. In still other embodiments, additional materials and attachment structures may be used.

Figure 5:
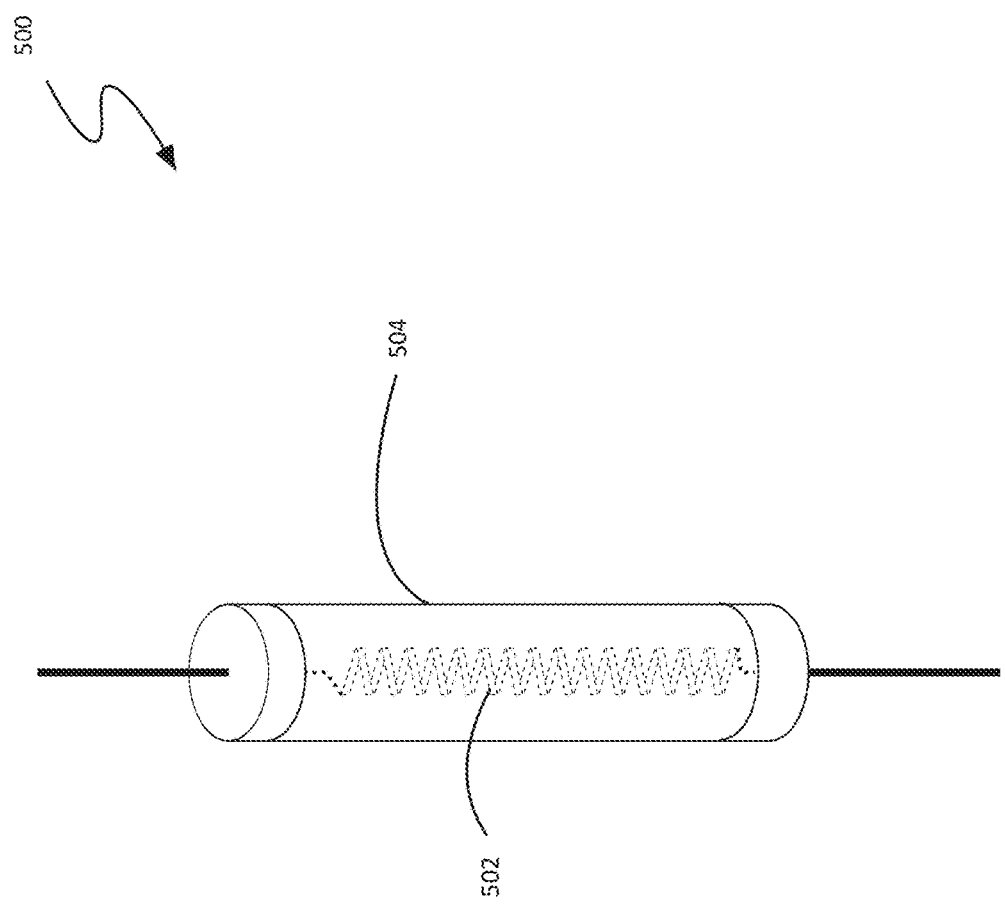
FIG. 5 is a perspective view of a high temperature heater lamp.

FIG. 5 is a perspective view of a non-limiting example of a high temperature heater lamp 110. Conventional electric heat lamps able to reach the threshold for this thermochemical cycle (i.e., temperatures over 1450° C.) tend to be expensive and very slow. A slow heater will reduce the overall efficiency of the reactor 100, as it will be slow to adapt to changing conditions within the reactor 100, which may include fluctuations in reaction rates, gas flow rates, and the like. Conventional incandescent heat lamps are able to ramp up and down in temperature very quickly, but have difficulty reaching the desired temperature range.

According to various embodiments, the high temperature electric heater 110 may be a fast-cycling, high temperature incandescent heat lamp 500 comprising a filament 502 housed in an envelope 504 composed of refractory material. Able to quickly ramp up and down in temperature, while also reaching temperatures as high as 1700° C., or higher, using these incandescent heat lamps 500 results in shorter cycle times than existing reactor designs, leading to higher productivities per unit $MO_x$, and higher power densities.

Higher efficiency and power density are also obtained from the use of more effective heaters that can reach higher reaction temperatures within the reduction zone 102.

Figure 6:
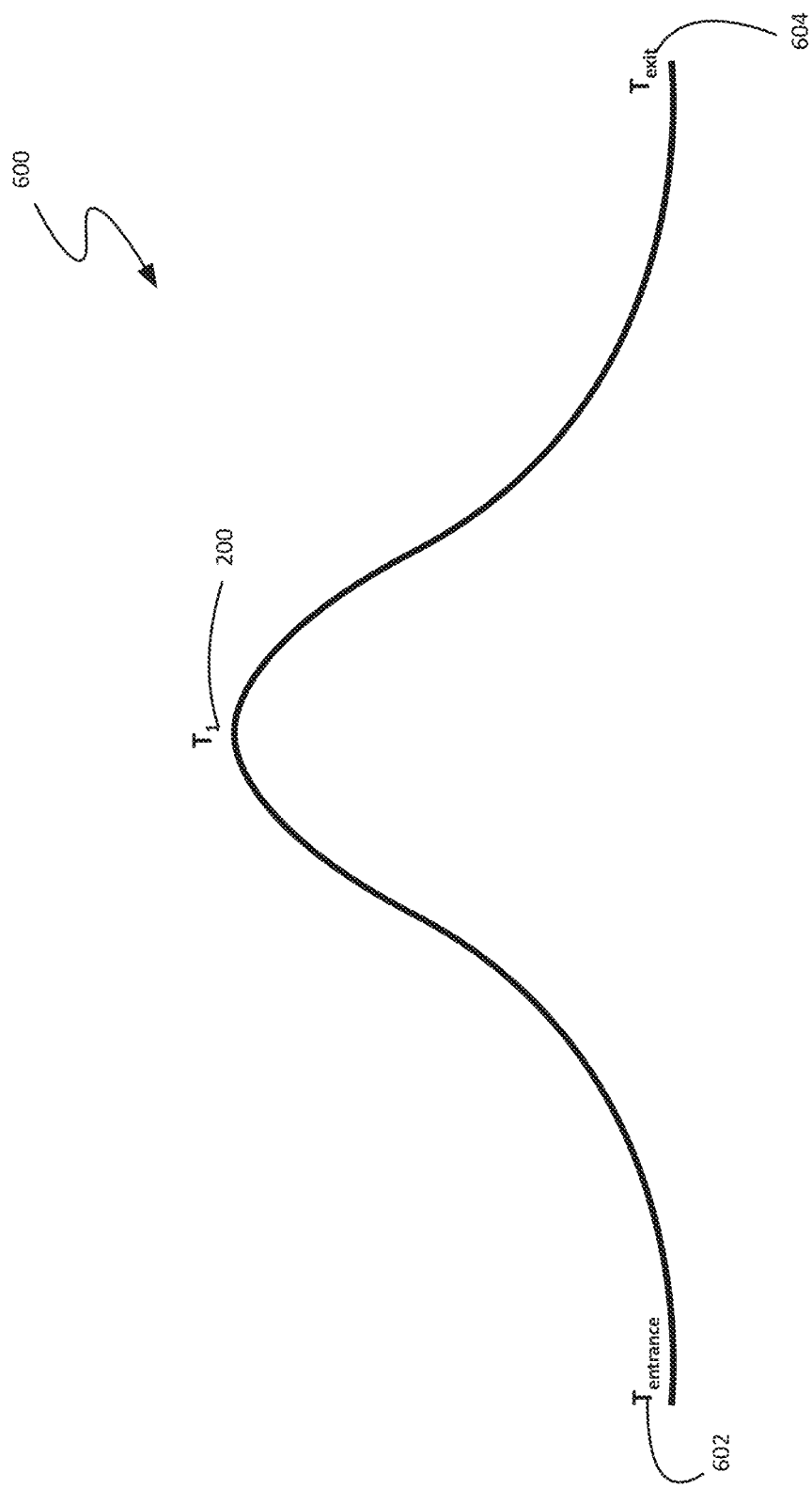
FIG. 6 is a schematic view of a reduction zone temperature profile.

FIG. 6 is a schematic view of a non-limiting example of a reduction zone temperature profile 600. In some embodiments, the electric heaters 110 may be driven to maintain a constant temperature (e.g., the first temperature 200) throughout the reduction zone 102. As an option, the fast-cycling incandescent heater lamps 500 may quickly adapt to the previously mentioned fluctuations to keep up with changing conditions. In other embodiments, however, the plurality of electric heaters 110 may be used to create a temperature profile 600 within the reduction zone 102.

As a specific, non-limiting example, in one embodiment, the reduction zone 102 may have a temperature profile 600 created by the electric heaters 110, the temperature profile 600 beginning with an entrance temperature 602 proximate the first entrance 106, then rising to the first temperature 200 proximate the midpoint 204 (with respect to the length) of the reduction zone 102, then falling again to an exit temperature 604, proximate the first exit 108. The entrance temperature 602 and the exit temperature 604 are both lower than the first temperature 200. In the context of the present description and the claims that follow, proximate a portal such as the first entrance 106 or first exit 108 means a point at that portal, or at least closer to that portal than to the midpoint 204 of the reduction channel 104.

According to various embodiments, the use of a temperature profile 600 within the reduction channel 104 helps maximize the extent of the reduction performed on the reactive material 140 as it passes through the reduction zone 102. The use of a profile 600 may be advantageous over having a constant temperature throughout the reduction channel 104. The use of a constant temperature would mean that a large amount of sweep gas 212 would be needed to reduce the reactive material 140 and remove the released oxygen 222 (otherwise, the reduction would be limited). Sweep gas 212 can be resource intensive, since it needs to be heated and purified before introduction to the reactor 100, lest it disrupt the thermochemical cycle. The use of a temperature profile 600 mitigates this, allowing for increased reduction without requiring as much sweep gas 212. The shape of a temperature profile 600 may depend on a number of factors including, but not limited to, reduction temperature (e.g., the first temperature 200), gas flow, reactive material 140, and the like. In some embodiments, the temperature profile 600 may be weighted more towards one end of the channel 104 than the other.

In some embodiments, a temperature profile 600 may be implemented within the reoxidation zone 116, for increased productivity. Since the reoxidation reaction is exothermic, in some embodiments steam may be introduced in various locations within the reoxidation zone 116, rather than applying heat in addition to the steam. The temperature and/or flow rate of the steam may be tuned to create a temperature profile that maximizes the productivity of the reoxidation zone 116, and the reactor 100 as a whole.

It will be understood that implementations are not limited to the specific components disclosed herein, as virtually any components consistent with the intended operation of a method and/or system implementation of a two-step thermochemical labyrinth reactor 100 may be utilized. Accordingly, for example, although particular reactive materials 140, insulation methods, reactor geometries, feedstocks, and heaters may be disclosed, such components may comprise any shape, size, style, type, model, version, class, grade, measurement, concentration, material, weight, quantity, and/ or the like consistent with the intended operation of a method and/or system implementation for a thermochemical labyrinth reactor 100 may be used. In places where the description above refers to particular implementations of a thermochemical labyrinth reactor 100, it should be readily apparent that a number of modifications may be made without departing from the spirit thereof and that these implementations may be applied to other thermochemical reactors.

What is claimed is:

1. A thermochemical labyrinth reactor, comprising:
a reduction zone having a first temperature and comprising a plurality of high temperature electric heaters and a reduction channel passing through the reduction zone, the reduction channel comprising a first entrance and a first exit;
a reoxidation zone having a second temperature that is less than the first temperature, the reoxidation zone comprising a reoxidation channel passing through the reoxidation zone, the reoxidation channel comprising a second entrance and a second exit;
a recuperation zone connecting the reduction zone and the reoxidation zone, the recuperation zone having a first recuperation channel passing through the recuperation zone and a second recuperation channel passing through the recuperation zone, the first recuperation channel adjoining the second recuperation channel for a majority of the recuperation zone, the first recuperation channel being separated from the second recuperation channel by a plurality of windows for at least the majority of the recuperation zone, the plurality of windows being substantially transparent to infrared radiation, allowing an exchange of thermal radiation between the first recuperation channel and the second recuperation channel while preventing an exchange of gases between the first recuperation channel and the second recuperation channel;
a plurality of reactor plates composed of a reactive material;
a transit system comprising a track running through the reduction zone, the recuperation zone, and the reoxidation zone, the plurality of reactor plates movably coupled to the track, the transit system configured to shuttle the plurality of reactor plates between the reduction zone and the reoxidation zone by moving the plurality of reactor plates along the track in a circuit running from the first exit to the second entrance via the first recuperation channel, through the second entrance to the second exit, then from the second exit to the first entrance via the second recuperation channel, finally returning to the first exit via the first entrance;
a feedstock gas emitter in fluid communication with the reoxidation channel and configured to introduce a feedstock gas flowing in a gas flow direction toward the second entrance, the gas flow direction being opposite the movement of the plurality of reactor plates throughout the circuit;
a first gas extractor in fluid communication with the reoxidation channel and configured to extract a product gas as it moves away from the second exit in the gas flow direction, the product gas resulting from the feedstock gas being split by the reactive material oxidizing as it passes through the reoxidation channel;
a sweep gas emitter in fluid communication with the reduction channel and configured to introduce a sweep gas flowing through the reduction channel in the gas flow direction toward the first entrance;

a second gas extractor in fluid communication with the reduction channel and configured to extract a sweep gas mixture as it moves away from the first exit in the gas flow direction, the sweep gas mixture comprising the sweep gas and oxygen released by the reactor plates as they pass through the reduction channel and are reduced; and an insulating housing having an exterior;

wherein the reduction zone, the reoxidation zone, and the recuperation zone are all surrounded by the insulating housing, with the reoxidation zone being closer to the exterior of the insulating housing than the reduction zone;

wherein the high temperature electric heaters are each incandescent heat lamps comprising a filament within an envelope, the envelope composed of refractory material;

wherein the first temperature is at least 1600° C. and the second temperature is at least 1000° C.

2. The thermochemical labyrinth reactor of claim 1, wherein the plurality of windows within the recuperation zone are composed of sapphire.

3. The thermochemical labyrinth reactor of claim 1, wherein the reactive material is one of cerium oxide, iron oxide, and zinc oxide.

4. The thermochemical labyrinth reactor of claim 1, wherein the reduction zone comprises a temperature profile, the temperature profile beginning with an entrance temperature proximate the first entrance, then rising to the first temperature proximate a midpoint of the reduction channel, then falling to an exit temperature proximate the first exit, wherein the entrance temperature and the exit temperature are both lower than the first temperature.

5. The thermochemical labyrinth reactor of claim 1, wherein the feedstock gas comprises one of water and carbon dioxide, and wherein the product gas comprises one of hydrogen and carbon monoxide.

6. The thermochemical labyrinth reactor of claim 1, wherein the reactor plates of the plurality of reactor plates each have a width, a thickness, and a height, wherein the width is at least one order of magnitude larger than the thickness and the height is at least two orders of magnitude larger than the thickness.

7. A thermochemical labyrinth reactor, comprising:

a reduction zone having a first temperature and comprising a plurality of high temperature electric heaters and a reduction channel passing through the reduction zone, the reduction channel comprising a first entrance and a first exit;

a reoxidation zone having a second temperature that is less than the first temperature, the reoxidation zone comprising a reoxidation channel passing through the reoxidation zone, the reoxidation channel comprising a second entrance and a second exit;

a recuperation zone connecting the reduction zone and the reoxidation zone, the recuperation zone having a first recuperation channel passing through the recuperation zone and a second recuperation channel passing through the recuperation zone, the first recuperation channel adjoining the second recuperation channel for a majority of the recuperation zone, the first recuperation channel being separated from the second recuperation channel by a plurality of windows for at least the majority of the recuperation zone, the plurality of windows being substantially transparent to infrared radiation, allowing an exchange of thermal radiation between the first recuperation channel and the second recuperation channel, the first recuperation channel in fluid communication with the second recuperation channel only through the reduction channel and the deoxidation channel;

a plurality of reactor plates composed of a reactive material;

a transit system comprising a track running through the reduction zone, the recuperation zone, and the reoxidation zone, the plurality of reactor plates movably coupled to the track, the transit system configured to shuttle the plurality of reactor plates between the reduction zone and the reoxidation zone by moving the plurality of reactor plates along the track in a circuit running from the first exit to the second entrance via the first recuperation channel, through the second entrance to the second exit, then from the second exit to the first entrance via the second recuperation channel, finally returning to the first exit via the first entrance;

a feedstock gas emitter in fluid communication with the reoxidation channel and configured to introduce a feedstock gas flowing in a gas flow direction toward the second entrance, the gas flow direction being opposite the movement of the plurality of reactor plates throughout the circuit;

a first gas extractor in fluid communication with the reoxidation channel and configured to extract a product gas as it moves away from the second exit in the gas flow direction, the product gas resulting from the feedstock gas being split by the reactive material oxidizing as it passes through the reoxidation channel; and an insulating housing, wherein the reduction zone, the reoxidation zone, and the recuperation zone are all surrounded by the insulating housing.

8. The thermochemical labyrinth reactor of claim 7, further comprising:

a sweep gas emitter in fluid communication with the reduction channel and configured to introduce a sweep gas flowing through the reduction channel in the gas flow direction toward the first entrance; and a second gas extractor in fluid communication with the reduction channel and configured to extract a sweep gas mixture as it moves away from the first exit in the gas flow direction, the sweep gas mixture comprising the sweep gas and oxygen released by the reactor plates as they pass through the reduction channel and are reduced.

9. The thermochemical labyrinth reactor of claim 7, wherein the insulating housing comprises an exterior, and wherein the reoxidation zone is closer to the exterior of the insulating housing than the reduction zone.

10. The thermochemical labyrinth reactor of claim 7, wherein the high temperature electric heaters are incandescent heat lamps comprising a filament within an envelope, the envelope composed of refractory material.

11. The thermochemical labyrinth reactor of claim 7, wherein the plurality of windows within the recuperation zone are composed of sapphire.

12. The thermochemical labyrinth reactor of claim 7, wherein the reactive material is one of cerium oxide, iron oxide, and zinc oxide.

13. The thermochemical labyrinth reactor of claim 7, wherein the reduction zone comprises a temperature profile, the temperature profile beginning with an entrance temperature proximate the first entrance, then rising to the first temperature proximate a midpoint of the reduction channel, then falling to an exit temperature proximate the first exit, wherein the entrance temperature and the exit temperature are both lower than the first temperature.

14. The thermochemical labyrinth reactor of claim 7, wherein the first temperature is at least 1600° C. and the second temperature is at least 1000° C.

15. The thermochemical labyrinth reactor of claim 7, wherein the feedstock gas comprises one of water and carbon dioxide, and wherein the product gas comprises one of hydrogen and carbon monoxide.

16. The thermochemical labyrinth reactor of claim 7, wherein the reactor plates of the plurality of reactor plates each have a width, a thickness, and a height, wherein the width is at least one order of magnitude larger than the thickness and the height is at least two orders of magnitude larger than the thickness.

17. A method for operating a thermochemical labyrinth reactor, comprising:
   moving a plurality of reactor plates around a circuit within the thermochemical labyrinth reactor, the reactor comprising a reduction zone, a reoxidation zone, and a recuperation zone, the circuit running from a first entrance to a first exit of a reduction channel passing through the reduction zone, then running from the first exit through a first recuperation channel passing through the recuperation zone to a second entrance of a reoxidation channel passing through the reoxidation zone, then running from the second entrance to a second exit of the reoxidation channel, then running from the second exit through a second recuperation channel also passing through the recuperation zone to the first entrance, each plate of the plurality of reactor plates composed of a reactive material;
   reducing the reactive material by heating the reduction channel to a first temperature using high temperature electric heaters in the reduction zone, causing oxygen to be released into the reduction channel;
   flowing a sweep gas through the reduction channel in a gas flow direction toward the first entrance, forming a sweep gas mixture comprising the sweep gas and the oxygen released by the reactive material, the gas flow direction being opposite the motion of the plurality of reactor plates throughout the circuit;
   extracting the sweep gas mixture as it moves away from the first exit in the gas flow direction;
   oxidizing the reactive material within the reoxidation channel by flowing a feedstock gas through the reoxidation channel in the gas flow direction toward the second entrance as the reactive material moves through the reoxidation channel at a second temperature that is less than the first temperature, the feedstock gas splitting as the reactive material is oxidizing, releasing a product gas;
   extracting the product gas as it moves away from the second exit in the gas flow direction; and
   recovering heat from the reactive material by returning the reactive material from the reoxidation zone to the reduction zone via the second recuperation channel and exposing the reactive material in the second recuperation channel to thermal radiation from the reactive material in the first recuperation channel through a plurality of windows, the second recuperation channel adjoining the first recuperation channel for a majority of the recuperation zone, the second recuperation channel being separated from the first recuperation channel by the plurality of windows for at least the majority of the recuperation zone with the windows being substantially transparent to infrared radiation and allowing an exchange of thermal radiation between the first recuperation channel and the second recuperation channel while preventing an exchange of gases between the first recuperation channel and the second recuperation channel.

18. The method of claim 17, wherein the high temperature electric heaters are incandescent heat lamps comprising a filament within an envelope, the envelope composed of refractory material.

19. The method of claim 17, wherein the thermochemical labyrinth reactor comprises an insulating housing having an exterior, and wherein the reoxidation zone, the recuperation zone, and the reduction zone are all enclosed within the insulating housing with the reoxidation zone closer to the exterior of the insulating housing than the reduction zone.

20. The method of claim 17, wherein heating the reduction channel to the first temperature comprises establishing a temperature profile within the reduction zone, the temperature profile beginning with an entrance temperature proximate the first entrance, then rising to the first temperature proximate a midpoint of the reduction channel, then falling to an exit temperature proximate the first exit, wherein the entrance temperature and the exit temperature are both lower than the first temperature.

* * * * *